United States Patent
Zhang

(10) Patent No.: US 10,014,719 B2
(45) Date of Patent: Jul. 3, 2018

(54) UNINTERRUPTIBLE POWER SYSTEM

(71) Applicant: Huawei Technologies Co., Ltd., Shenzhen (CN)

(72) Inventor: Chuntao Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 322 days.

(21) Appl. No.: 15/083,858

(22) Filed: Mar. 29, 2016

(65) Prior Publication Data

US 2016/0211700 A1 Jul. 21, 2016

Related U.S. Application Data

(63) Continuation of application No. PCT/CN2015/085936, filed on Aug. 3, 2015.

(30) Foreign Application Priority Data

Dec. 11, 2014 (CN) .......................... 2014 1 0764153

(51) Int. Cl.
*H02J 9/06* (2006.01)
*H02J 7/00* (2006.01)

(52) U.S. Cl.
CPC ............ *H02J 9/062* (2013.01); *H02J 7/0068* (2013.01); *H02J 9/06* (2013.01); *H02J 9/061* (2013.01); *Y10T 307/625* (2015.04)

(58) Field of Classification Search
CPC ......... Y10T 307/625; H02J 9/06; H02J 9/061; H02J 9/062
See application file for complete search history.

(56) References Cited

U.S. PATENT DOCUMENTS 5,939,799 A * 8/1999 Weinstein ................. H02J 1/10
307/45

FOREIGN PATENT DOCUMENTS

| CN | 2904465 Y | 5/2007 |
|---|---|---|
| CN | 202978409 U | 6/2013 |
| CN | 103187789 A | 7/2013 |
| CN | 104065157 A | 9/2014 |
| CN | 104539042 A | 4/2015 |
| EP | 3054557 B1 * | 1/2018 |
| JP | 20080283729 A | 11/2008 |

(Continued)

OTHER PUBLICATIONS

Partial English Translation and Abstract of Chinese Patent Application No. CN104539042, Jan. 7, 2016, 5 pages.

(Continued)

*Primary Examiner* — Fritz M Fleming
(74) *Attorney, Agent, or Firm* — Conley Rose, P.C.

(57) ABSTRACT

An uninterruptible power system is provided. When a first power supply of the system is faulty, in a process in which a switch unit switches power supply from the first power supply to a second power supply, the second power supply discharges to a direct current bus using a bidirectional power converter, electric energy stored in the direct current bus is also discharged in a short time in a process of the switch, and the direct current bus outputs both a discharging current of the second power supply and a discharging current of the direct current bus to a system output end, which ensures that the direct current bus outputs a stable voltage in a gap period of an action of the switch unit.

13 Claims, 2 Drawing Sheets

(56) References Cited

FOREIGN PATENT DOCUMENTS

JP    2013048497 A    3/2013
WO    2014057298 A1   4/2014

OTHER PUBLICATIONS

Foreign Communication From a Counterpart Application, Chinese Application No. 201410764153.3, Chinese Office Action dated Apr. 27, 2016, 5 pages.
Foreign Communication From a Counterpart Application, PCT Application No. PCT/CN2015/085936, International Search Report dated Nov. 11, 2015, 8 pages.
Foreign Communication From a Counterpart Application, PCT Application No. PCT/CN2015/085936, Written Opinion dated Nov. 11, 2015, 4 pages.

\* cited by examiner

UNINTERRUPTIBLE POWER SYSTEM

CROSS-REFERENCE TO RELATED APPLICATIONS

This application is a continuation of International Application No. PCT/CN2015/085936, filed on Aug. 3, 2015, which claims priority to Chinese Patent Application No. 201410764153.3, filed on Dec. 11, 2014, both of which are hereby incorporated by reference in their entireties.

TECHNICAL FIELD

The present disclosure relates to the field of uninterruptible power supplies, and in particular, to an uninterruptible power system.

BACKGROUND

Currently, in China, only a minority of areas has just resolved a problem of electric power shortage, a majority of areas and big cities still face an urgent problem of shortage in electric power supply, and quality of power supplies cannot be ensured. Mains electricity cannot provide a clean and stable power supply that is needed by a sensitive electronic device, and a user is finally responsible for healthy and safe running of the device. Even in America and other western countries that have implemented electrification for a long time, quality of a power grid is far from reliability. Because of a problem in quality of a power grid, impact of various chance factors, and damages from natural disasters, negative phenomena of a power grid such as a voltage surge, electromagnetic noise, a sustained high voltage, and a sustained low voltage are also common in a developed country, and a long-term power outage may even occur.

An uninterruptible power system (UPS) is a device that can take the place of mains electricity to sustainably supply power during a power outage, includes an energy storage apparatus (battery), and continues to supply power during a fault or interruption of mains electricity, which ensures safety and reliability of power consumption of an user, and avoids losses caused by a fault of the mains electricity.

Generally, the UPS includes the following several parts: a rectifier (alternating current/direct current (AC/DC)), an inverter (DC/AC), a charger (CHG), an energy storage apparatus (battery), a bypass (STS), and a direct current bus (BUS). The direct current bus is an output of a rectifier AC/DC circuit, and is also an input voltage source of the inverter DC/AC. When a mains input of the UPS is normal, the mains input supplies power to a load using outputs of the rectifier (AC/DC) and the inverter (DC/AC). At the same time, a direct current bus charges a battery using a charger. When the mains input of the UPS is faulty, a switch apparatus switches to an input end of the battery, and the battery outputs, using DC/DC conversion, electric energy stored in the battery to a direct current bus, which ensures a stable direct current bus voltage. At the same time, the direct current bus supplies power to the load using DC/AC inversion conversion, which ensures a normal output.

During general use, by controlling the switch apparatus, the UPS may select mains electricity or a battery to supply power. However, during a switch between the mains electricity and the battery, a particular gap period without a mains electricity input or battery input exists in a switch process, and a time of the gap period is generally between several milliseconds to tens of milliseconds. Energy ($1/2CU^2$, where C is capacitance and U is voltage) stored in a direct current bus capacitor may maintain an uninterruptible output voltage, and power of the load is all supplied by energy stored in the direct current bus. Because the time is long, and the load is large, a requirement for a capacitance value of the direct current bus is high, and a cost competitive edge of a volume of the UPS is compromised.

SUMMARY

In view of this, embodiments of the present disclosure provide an uninterruptible power system.

According to a first aspect, an objective of the present disclosure is to provide an uninterruptible power system, where the system includes a first power supply configured to supply power to the system; a second power supply configured to, when the first power supply is faulty, supply power to the system; a switch unit configured to, when the first power supply is faulty, switch the first power supply to the second power supply, such that the second power supply supplies power to the system; or configured to, when a fault in the first power supply is restored, switch the second power supply to the first power supply, such that the first power supply supplies power to the system; a first power processing unit configured to, when the first power supply supplies power to the system, perform AC/DC rectification on a voltage to obtain a bus voltage of a direct current bus, or configured to, when the second power supply supplies power to the system, perform DC/DC conversion on a current to obtain a bus voltage of a direct current bus; the direct current bus configured to transport electric energy, and supply power to the system in an action gap period formed when the switch unit performs a switch between the first power supply and the second power supply; a second power processing unit configured to perform DC/AC inversion on the bus voltage of the direct current bus so as to obtain an output voltage; a bidirectional power conversion unit configured to supply power to the second power supply when the first power supply supplies power to the system, and supply power to the system in the action gap period formed when the switch unit performs the switch between the first power supply and the second power supply; and a system output end configured to connect to a load and output, to the load, power supplied by the system, where the first power supply is electrically connected to a first access end of the switch unit, the second power supply is electrically connected to a second access end of the switch unit, an output end of the switch unit is electrically connected to a first wiring end of the first power processing unit, a second wiring end of the first power processing unit is electrically connected to one end of the bidirectional power conversion unit, the other end of the bidirectional power conversion unit is electrically connected to the second power supply, the second wiring end of the first power processing unit is electrically connected to one end of the direct current bus, the other end of the direct current bus is electrically connected to a first wiring end of the second power processing unit, and a second wiring end of the second power processing unit is electrically connected to the system output end.

With reference to the first aspect, in a first implementation manner of the first aspect, the first power supply is a mains input bus, and the second power supply is an energy storage battery.

With reference to the first implementation manner of the first aspect, in a second implementation manner of the first aspect, the bidirectional power conversion unit includes a unidirectional charging subunit and a unidirectional discharging subunit, where the unidirectional charging subunit is configured to charge the energy storage battery; the unidirectional discharging subunit is configured to discharge from the energy storage battery to the system, so as to implement that both the energy storage battery and the direct current bus supply power to the system in a gap period of a switch performed by the switch unit; and the unidirectional charging subunit and the unidirectional discharging subunit are connected in parallel between the direct current bus and the energy storage battery.

With reference to the first implementation manner or the second implementation manner of the first aspect, in a third implementation manner of the first aspect, when the mains input bus is faulty, the bidirectional power conversion unit supplies power to the direct current bus and the first power processing unit is disabled; and when an action of the switch unit is switching over to the energy storage battery, a first power conversion unit is started such that the switch unit reliably switches.

With reference to the first implementation manner of the first aspect to the third implementation manner of the first aspect, in a fourth implementation manner of the first aspect, the system further includes a bypass input bus configured to, when a fault occurs, provide an extra standby channel so as to supply power to the load; and the bypass input bus is electrically connected to the system output end.

With reference to any implementation manner of the first aspect to the fourth implementation manner of the first aspect, in a fifth implementation manner of the first aspect, a capacitance value of the direct current bus is 40% to 60% of a capacitance value, when the direct current bus independently supplies power to the system, of a bus capacitor.

With reference to any implementation manner of the first aspect to the fifth implementation manner of the first aspect, in a sixth implementation manner of the first aspect, the switch unit includes a mechanical switch or a semiconductor switch.

With reference to the sixth implementation manner of the first aspect, in a seventh implementation manner of the first aspect, the mechanical switch includes a relay or a contactor, and the semiconductor switch includes a silicon controlled rectifier.

With reference to any implementation manner of the first implementation manner of the first aspect to the seventh implementation manner of the first aspect, in an eighth implementation manner of the first aspect, the mains input bus and the bypass input bus are industrial frequency alternating currents.

With reference to any implementation manner of the first implementation manner of the first aspect to the eighth implementation manner of the first aspect, in a ninth implementation manner of the first aspect, the energy storage battery includes but is not limited to a nickel-metal hydride (NiMH) battery, a nickel-cadmium (Ni—Cd) battery, a lithium iron phosphate battery, and an iron battery.

It may be learned from the foregoing technical solutions that the embodiments of the present disclosure have the following advantages.

The present disclosure provides an uninterruptible power system, when a first power supply of the system is faulty, in a process in which a switch unit switches power supply from the first power supply to a second power supply, the second power supply discharges to a direct current bus using a bidirectional power conversion unit, electric energy stored in the direct current bus is also discharged, and the direct current bus outputs both a discharging current of the second power supply and a discharging current of the direct current bus to a system output end, which ensures that the direct current bus outputs a stable voltage in a gap period of an action of the switch unit. Because discharging of the bidirectional power conversion unit supports a voltage of the direct current bus in a process of a switch, a requirement for a capacitance value of the direct current bus may be lowered. In addition, electric energy stored in the direct current bus is discharged to share a part of the voltage of the direct current bus, such that an output voltage of the bidirectional power conversion unit is reduced; and further, power of the bidirectional power conversion unit may be reduced, and a volume of the bidirectional power conversion unit may be reduced.

DESCRIPTION OF EMBODIMENTS

Embodiments of the present disclosure provide an uninterruptible power system to lower a requirement for a capacitance value of a direct current bus, such that an output voltage of a bidirectional power conversion unit is reduced; and further, power of the bidirectional power conversion unit may be reduced, and a volume of the bidirectional power conversion unit is reduced, thereby reducing costs.

To make a person skilled in the art better understand the technical solutions in the present disclosure, the following clearly describes the technical solutions in the embodiments of the present disclosure with reference to the accompanying drawings in the embodiments of the present disclosure. The described embodiments are merely a part rather than all of the embodiments of the present disclosure. All other embodiments obtained by a person of ordinary skill in the art based on the embodiments of the present disclosure without creative efforts shall fall within the protection scope of the present disclosure.

In the specification, claims, and accompanying drawings of the present disclosure, the terms "first", "second", "third", "fourth", and so on are intended to distinguish between similar objects but do not necessarily indicate a specific order or sequence. It should be understood that the data termed in such a way are interchangeable in proper circumstances such that the embodiments of the present disclosure described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those units, but may include other steps or units not expressly listed or inherent to such a process, method, system, product, or device.

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person skilled in the art based on the embodiments of the present disclosure without creative efforts shall fall within the protection scope of the present disclosure.

Figure 1:
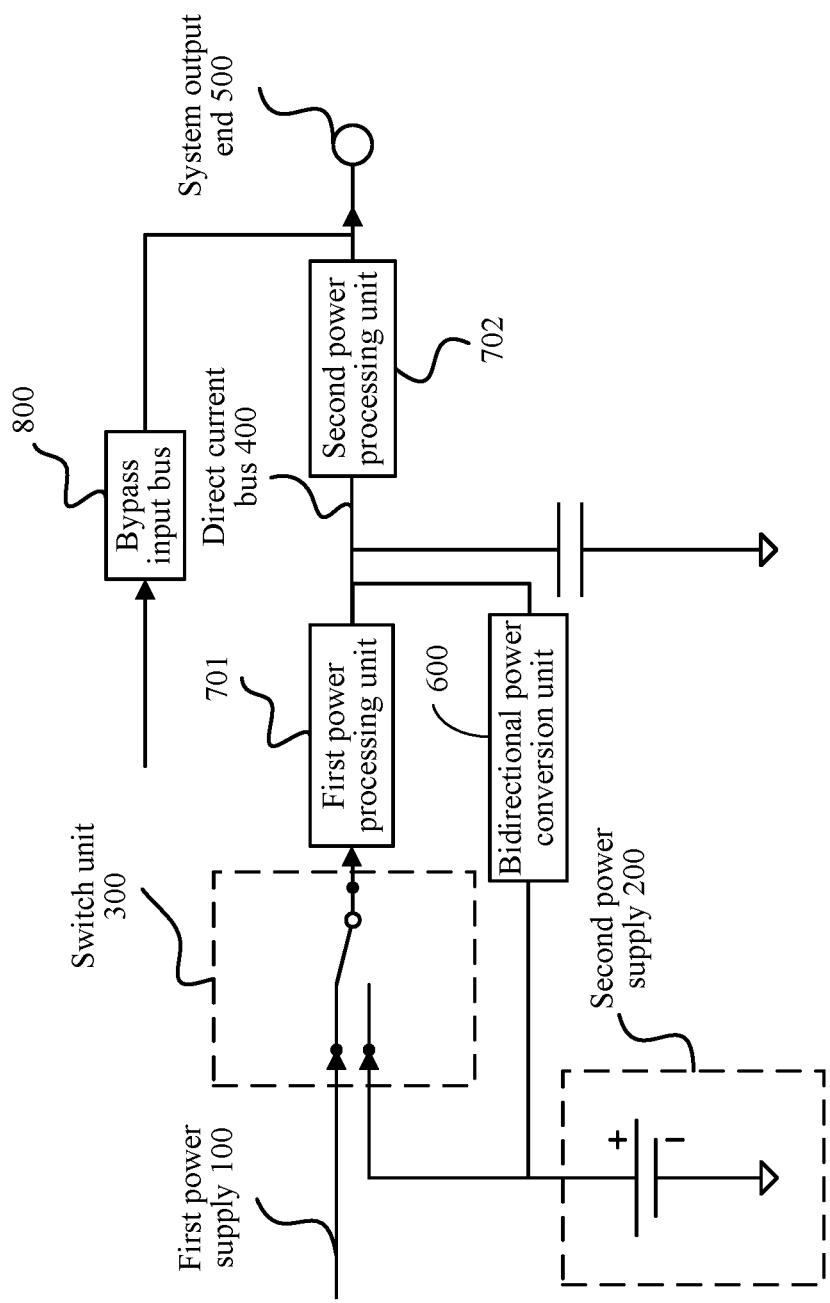
FIG. 1 is a structural diagram of an embodiment of an uninterruptible power system according to the present disclosure.

With reference to FIG. 1, FIG. 1 shows an embodiment of an uninterruptible power system provided in the present disclosure, where the system includes a first power supply 100, a second power supply 200, a switch unit 300, a first power processing unit 701, a direct current bus 400, a second power processing unit 702, a bidirectional power conversion unit 600, and a system output end 500.

The first power supply 100 is configured to supply power to the system.

The first power supply 100 may be selected from a mains input bus or an energy storage battery, an alternating current or a direct current may be selected for the mains input bus, the alternating current may be output, by means of rectification, to the direct current bus 400, and the direct current bus 400 performs filtering processing on the direct current, and a direct current may be used to charge the direct current bus 400 of the direct current. When a direct current is used by a mains input bus for inputting, the direct current may be output to the direct current bus after undergoing a voltage boosting operation using DC/DC conversion, and the direct current bus performs charging using the direct current so as to store energy.

The second power supply 200 is configured to, when the first power supply 100 is faulty, supply power to the system.

The second power supply 200 may be selected from an energy storage battery or a mains input bus. For example, when the first power supply 100 is selected as the mains input bus, the second power supply 200 may be selected as the energy storage battery, or when the first power supply 100 is selected as the energy storage battery, the second power supply 200 is the mains input bus. The mains input bus may be selected for both, or the energy storage battery may be selected for both, which is not limited, provided that power can be supplied to the system promptly after the switch unit switches to the second power supply 200 so as to ensure an uninterruptible output voltage of the system.

The energy storage battery may be a NiMH battery, a Ni—Cd battery, a lithium iron phosphate battery, or an iron battery, or may be another energy storage apparatus.

The switch unit 300 is configured to, when the first power supply 100 is faulty, switch the first power supply 100 to the second power supply 200, such that the second power supply 200 supplies power to the system; or configured to, when a fault in the first power supply 100 is restored, switch the second power supply 200 to the first power supply 100, such that the first power supply 100 supplies power to the system.

The switch unit 300 includes a first access end, a second access end, and an output end. The switch unit 300 uses a mechanical switch or a semiconductor switch. The mechanical switch may use a relay or a contactor, and the semiconductor switch may use a silicon controlled rectifier so as to implement a quick switch. A shorter gap period of a switch action is better because a longer gap period of a switch action indicates a larger capacitance of the direct current bus 400, a higher voltage that is of the second power supply 200 and needs to output to the system, and a higher requirement for a capacitance value of the direct current bus 400, such that power of a unidirectional discharging subunit 602 (shown in FIG. 2) is also improved, which is disadvantageous to reduction of volumes and costs of the direct current bus 400 and the unidirectional discharging subunit 602.

The first power processing unit 701 is configured to, when the first power supply 100 supplies power to the system, perform AC/DC rectification on a voltage to obtain a bus voltage of the direct current bus 400, or configured to, when the second power supply 200 supplies power to the system, perform DC/DC conversion on a current to obtain a bus voltage of the direct current bus 400.

The first power processing unit 701 has a function of rectification and voltage boosting. When the switch unit 300 outputs an alternating current from mains electricity, the first power processing unit 701 performs rectification on the alternating current using AC/DC rectification conversion of the first power processing unit 701 to obtain a direct current, and outputs the obtained direct current to the direct current bus 400. When the switch unit 300 outputs a direct current from the second power supply 200, the first power processing unit 701 performs DC/DC voltage boosting conversion on the direct current, and then outputs, to the direct current bus 400, a direct current obtained by means of voltage boosting. The first power processing unit 701 in this embodiment may implement a switch between an AC/DC conversion function and a DC/DC conversion function using a software algorithm, and may also be an independent AC/DC rectifying circuit and DC/DC conversion circuit, which is not limited herein.

The direct current bus 400 is configured to transport electric energy, and supply power to the system in an action gap period formed when the switch unit 300 performs a switch between the first power supply 100 and the second power supply 200.

The direct current bus 400 in the present disclosure has two functions, where one function is performing filtering on a direct current, and the other function is charging using a direct current. The direct current bus 400 discharges to the system in a gap period in which the switch unit 300 performs a switch action, so as to support an output voltage of the direct current bus 400, where a direct current bus capacitor may be disposed in the direct current bus 400. According to a nature of passing a direct current and blocking an alternating current of a capacitor, a current output to the direct current bus capacitor must be a direct current. When a current output by the first power supply is an alternating current, rectification needs to be performed, and a direct current obtained after rectification is output to the first power supply 100. When the first power supply 100 outputs a direct current, voltage step-down conversion may be performed to step down a direct current of a high voltage level to a direct current of a low voltage level, and the direct current of a low voltage level is output to the direct current bus 400.

The second power processing unit 702 is configured to perform DC/AC inversion on a bus voltage of the direct current bus 400 so as to obtain an output voltage.

In this embodiment, the second power processing unit 702 has a DC/AC inversion function, that is, performs inversion on a direct current received from the direct current bus 400 to obtain an alternating current, and outputs the alternating current to the system output end 500 such that the alternating current is used by a load.

The bidirectional power conversion unit 600 is configured to, during a period in which the first power supply 100 supplies power to the system, supply power to the second power supply 200 and charge the second power supply 200; and during a gap period of a switch action of the switch unit 300, supply power to the system.

The bidirectional power conversion unit 600 is connected to the second power supply 200, and may include a charging circuit and a discharging circuit, that is, may include a DC/DC circuit. When the first power supply 100 operates properly, a current on the direct current bus 400 is converted to charge the second power supply 200. When the first power supply 100 is faulty, the switch unit 300 performs a switch. In a gap period of a switch action, that is, when neither the first power supply 100 nor the second power supply 200 supplies power to the system, the direct current bus capacitor needs to discharge electric energy stored in the direct current bus capacitor to the system. The bidirectional power conversion unit 600 promptly discharges electric energy of the second power supply 200 to the system. Because the bidirectional power conversion unit 600 is directly connected to the second power supply 200 and the direct current bus 400 without a need of performing a switch action by the switch unit 300. A switch time for discharging the electric energy of the second power supply 200 by the bidirectional power conversion unit 600 is short, and both the direct current bus capacitor and the bidirectional power conversion unit 600 supply power to the system to support an output voltage of the direct current bus 400, which neither requires a large-power power device to implement discharge of the second power supply 200 nor requires a direct current bus capacitor with a large capacitance value, such that a volume of the DC/DC circuit may be reduced and a usage cost of the DC/DC circuit may also be reduced.

The system output end 500 is configured to connect to a load and output, to the load, power supplied by the system.

The following introduces connection relationships between the parts.

The first power supply 100 is electrically connected to the first access end of the switch unit 300, the second power supply 200 is electrically connected to the second access end of the switch unit 300, the output end of the switch unit 300 is electrically connected to a first wiring end of the first power processing unit 701, a second output end of the first power processing unit 701 electrically connected to one end of the bidirectional power conversion unit 600, the other end of the bidirectional power conversion unit 600 is electrically connected to a wiring end of the second power supply 200, the second wiring end of the first power processing unit 701 is electrically connected to one end of the direct current bus 400, the other end of the direct current bus 400 is electrically connected to a first wiring end of the second power processing unit 702, and a second wiring end of the second power processing unit 702 is electrically connected to the system output end 500.

In the uninterruptible power system provided in the present disclosure, when the first power supply 100 in the system is faulty, in a process in which the switch unit 300 switches power supply from the first power supply 100 to the second power supply 200, the second power supply 200 discharges to the direct current bus 400 using the bidirectional power conversion unit 600, the direct current bus capacitor also discharges to the direct current bus 400, and the direct current bus 400 outputs both a discharging current of the second power supply 200 and a discharging current of the direct current bus capacitor to the system output end 500, which ensures that the direct current bus 400 outputs a stable voltage in a gap period of an action performed by the switch unit 300. Because discharging of the bidirectional power conversion unit 600 supports a voltage of the direct current bus 400 in a switch process, a requirement for a capacitance value of the direct current bus 400 may be reduced and electric energy stored in the direct current bus 400 is discharged to share a part of the voltage of the direct current bus 400, such that an output voltage of the bidirectional power conversion unit 600 is reduced, power of the bidirectional power conversion unit 600 may further be reduced, and a volume of the bidirectional power conversion unit 600 is reduced.

In a preferable solution, in the foregoing embodiment, a first power supply 100 is a mains input bus, and a second power supply 200 is an energy storage battery. Using the foregoing structure, it may be implemented that, when the mains input bus is faulty, in a gap period of a switch action performed by a switch unit 300, a direct current bus 400 and the energy storage battery are used to supply power to a system at the same time, which lowers a usage cost of a power device and a requirement for a capacitance value of a direct current bus. In addition, when the mains input bus is restored, in a gap period formed when the switch unit 300 switches circuit power supply from the energy storage battery to the mains input bus, the energy storage battery and the direct current bus are used to supply power to the system at the same time to support a voltage of the direct current bus 400, such that voltage support for the direct current bus 400 may be obtained in a gap period of performing a switch.

Figure 2:
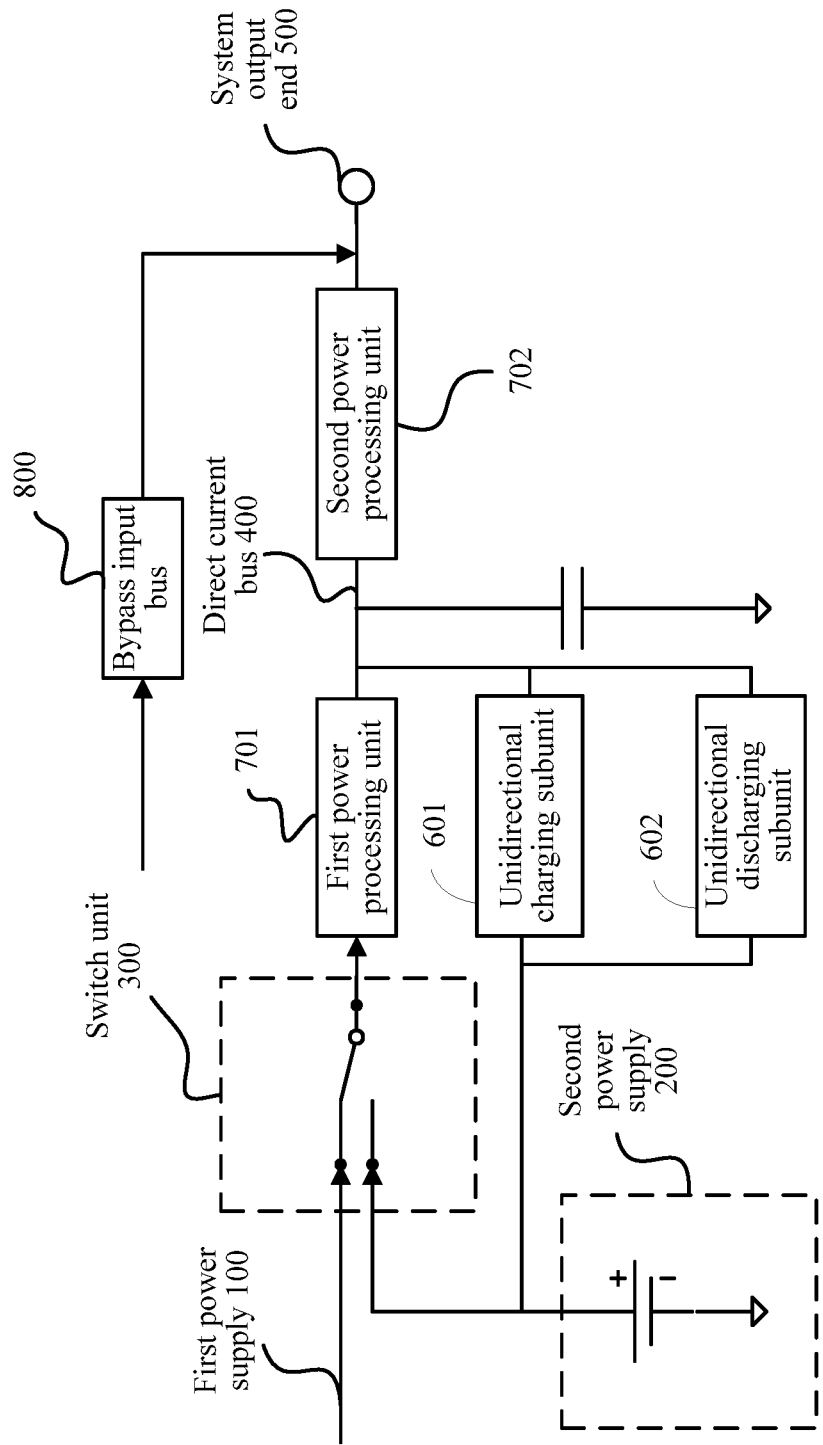
FIG. 2 is a structural diagram of another embodiment of an uninterruptible power system according to the present disclosure.

With reference to FIG. 2, for the bidirectional power conversion unit 600 of FIG. 1, the present disclosure further provides another embodiment of an uninterruptible power system, which is introduced in the following.

The bidirectional power conversion unit 600 includes a unidirectional charging subunit 601 and a unidirectional discharging subunit 602, where the unidirectional charging subunit 601 is configured to charge a second power supply 200, and when the system runs properly, charge the second power supply 200 using a voltage output by a mains input bus.

The unidirectional charging subunit 601 is electrically connected to a first power processing unit 701, the second power supply 200 is charged using a direct current output by the first power processing unit 701, and a structure of the unidirectional charging subunit 601 may be configured using a common charging circuit, which should be understood by a person of ordinary skill in the art. Details are not described again.

A current flow direction of charging the second power supply 200 using the unidirectional charging unit 601 is as follows: a first power supply 100→a switch unit 300→the first power processing unit 701→the unidirectional charging subunit 601→the second power supply 200.

The unidirectional discharging subunit 602 is configured to discharge from the second power supply 200 to the system, so as to implement that power is supplied to the system using both electric energy stored in the second power supply 200 and electric energy stored in a direct current bus 400 in a gap period of a switch performed by the switch unit 300.

In a process of a switch action performed by the switch unit 300, the unidirectional discharging subunit 602 releases the electric energy in the second power supply 200, and the unidirectional discharging subunit 602 outputs, to the direct current bus 400, the electric energy released from the second power supply 200 to support a bus voltage. A structure of the unidirectional discharging subunit 602 may be configured using a structure of a discharging circuit and a specific structure is not limited provided that the second power supply 200 is discharged.

When the unidirectional discharging subunit 602 performs a discharging operation, a current flow direction of a circuit is as follows: the second power supply 200→the unidirectional discharging subunit 602→the direct current bus 400→a second power processing unit 702→a system output end 500.

The unidirectional charging subunit 601 and the unidirectional discharging subunit 602 are connected in parallel between an output end of the first power processing unit 701 and the second power supply 200.

Using two independent structures, that is, using the unidirectional charging subunit 601 and the unidirectional discharging subunit 602 can also avoid a defect of a large volume of the entire bidirectional power conversion unit 600. Compared with only a unidirectional charging unit existing in the prior art, the unidirectional discharging subunit 602 is added in the present disclosure, and a voltage of the direct current bus 400 is supported by the unidirectional discharging subunit 602 by discharging electric energy stored in the direct current bus 400 in a gap period of a switch action performed by the switch unit 300 so as to ensure a stable output voltage. Because the unidirectional discharging subunit 602 and the direct current bus 400 each share a part of the output voltage, a requirement for a power level of the unidirectional discharging subunit 602 is lowered, defects of a high cost and a large volume of a DC/DC conversion circuit that uses large power are avoided, and a requirement for a capacitance value of the direct current bus 400 may also be lowered. A direct current bus 400 with a lower capacitance value may be selected so as to reduce a volume and reduce costs.

In a preferable solution, when the first power supply 100 is faulty, the bidirectional power conversion unit 600 supplies power to the direct current bus 400; when a voltage still exists in the first power supply 100, the first power processing unit 701 is first disabled such that the direct current bus is powered off and a voltage of the switch unit 300 decreases to 0; then an action of the switch unit 300 is switching over to the second power supply 200; then the first power processing unit 701 is started, and the second power supply 200 supplies power to the direct current bus 400. Because of support of the bidirectional power conversion unit 600 in a switch period, the switch unit 300 may implement a zero-current switch of the switch unit 300, which greatly improves security and reliability of the switch unit 300. The zero-current switch is implemented such that the switch unit reliably switches, which avoids a safety hazard problem generated by a switch with a current.

A fault of the first power supply 100 includes occurrence of cases such as a high voltage, frequency conversion, intermittent disconnection, a phase variation, and power-off.

According to the direct current bus 400 mentioned in the foregoing, the direct current bus 400 may serve as an output of the first power processing unit 701, and may also serve as an input voltage source of the second power processing unit 702. When the first power supply 100 operates properly, the first power processing unit 701 is used as a rectifying circuit and rectifies an alternating current of the first power supply 100 to a direct current using an AC/DC conversion circuit of the first power processing unit 701, and the first power processing unit 701 outputs, to the direct current bus 400, the direct current obtained by means of rectification. The direct current bus 400 has a direct current bus capacitor, and may perform filtering using the direct current bus capacitor. An inductance high-frequency ripple current obtained by means of AC/DC conversion may be filtered so as to obtain a stable direct current voltage, which is then input to the second power processing unit 702. In addition, when the first power supply 100 operates properly, the direct current bus capacitor is charged so as to store energy using the direct current obtained by means of rectification by the first power processing unit 701 so as to store some electric energy in the direct current bus capacitor, such that when neither the first power supply 100 nor the second power supply 200 supplies power to the system, that is, in a gap period of an action performed by the switch unit 300, $(1/2CU^2)$ stored in the direct current bus capacitor is discharged to the system and electric energy output by means of discharging using the direct current bus 400 maintains an uninterruptible output voltage. The second power processing unit 702 performs DC/AC inversion on a stable direct current voltage input by the direct current bus 400 to obtain an alternating current and outputs the alternating current to the load.

When power supply of the system is switched over to the second power supply 200 by the switch unit 300, the second power supply 200 performs DC/DC voltage boosting conversion, using the first power processing unit 701, on the electric energy stored in the second power supply 200 to perform voltage boosting. In this case, the first power processing unit 701 is used as an entity of DC/DC voltage boosting conversion. For distinguishing, a direct current obtained by means of rectification from the first power supply 100 is defined as a first direct current voltage, a direct current obtained by means of boosting from the second power supply 200 is defined as a second direct current voltage, and details are not described again in the following.

The direct current bus 400 is electrically connected to the first power processing unit 701. The direct current bus 400 serves as an output of the first power processing unit 701. The first direct current voltage or the second direct current voltage obtained by the first power processing unit 701 is output to the direct current bus 400. The direct current bus 400 performs filtering on the first direct current voltage or the second direct current voltage to obtain a stable direct current voltage, which is output to the second power processing unit 702. At the same time, the first direct current voltage or the second direct current voltage is used to charge the capacitor of the direct current bus 400, and the capacitor of the direct current bus 400 is used to store energy so as to provide support for an output voltage of the direct current bus 400 in a gap period of an action performed by the switch unit 300, and ensure the uninterruptible output voltage of the direct current bus 400.

It may be learned from formula $1/2CU^2$ of energy storage of the direct current bus capacitor that, a larger capacitance value indicates more stored electric energy, a longer gap period of a switch action of the switch unit 300 indicates a need of a larger capacitance value of the direct current bus capacitor, and reducing a capacitance value of the direct current bus 400 may not only reduce a volume of the direct current bus 400, but also greatly reduce costs.

Preferably, the direct current bus 400 is electrically connected to the second power processing unit 702 such that when the direct current bus capacitor discharges in a gap period of a switch performed by the switch unit 300, a direct current is output to the second power processing unit 702 and DC/AC inversion is performed on the direct current. The second power processing unit 702 outputs an alternating current obtained by means of inversion to the load, and the direct current bus capacitor is used to store energy, so as to provide support for output voltage of the direct current bus 400 in a gap period of an action performed by the switch unit 300, and ensure the uninterruptible output voltage of the direct current bus 400.

The second power supply 200 is added to discharge to the direct current bus 400 in a gap period of a switch action of the switch unit 300, such that a part of output voltage may be shared, and the direct current bus capacitor does not need to bear all of the output voltage. Therefore, a capacitance value of the direct current bus 400 may be reduced. A capacitance value of the direct current bus capacitor may be selected as 40% to 60% of a capacitance value, when the direct current bus 400 independently supplies power, of the bus capacitor, preferably selected as 50%. When the direct current bus 400 independently supplies power, that is, when the second power supply 200 is not used to discharge and only the direct current bus capacitor is used to discharge so as to support a voltage of the system, a capacitance value of the direct current bus capacitor in this case needs to be relatively large. Therefore, reducing a capacitance value of the direct current bus 400 may not only reduce a volume of the direct current bus 400, but also greatly reduce costs.

In a preferable solution, power of the unidirectional charging subunit 601 is 10% to 20% of rated power of the system.

Power of the unidirectional discharging subunit 602 is 10% to 20% of rated power of the system.

The direct current bus capacitor also discharges at the same time to the direct current bus 400 in a gap period of a switch action performed by the switch unit 300 so as to support an output voltage of the direct current bus 400. The direct current bus capacitor and the second power supply 200 simultaneously discharge to the direct current bus 400. Compared with dependence on discharge of the single second power supply 200 to support an output voltage of the direct current bus 400, a requirement for power of the unidirectional discharging subunit 602 is lowered. That is, dependence only on the unidirectional discharging subunit 602 to discharge energy of the second power supply 200 requires a larger improvement of a voltage, and a requirement for power of the unidirectional discharging subunit 602 is quite high. Therefore, the direct current bus capacitor and the second power supply 200 simultaneously discharge to support an input voltage of the direct current bus 400, such that power of the unidirectional discharging subunit 602 may be reduced to 10% to 20% of the rated power of the system. Reducing the power of the unidirectional discharging subunit 602 may not only reduce a volume of the unidirectional discharging subunit 602, but also reduce a usage cost of a power device.

With reference to FIG. 2, in a preferable solution, the system further includes a bypass input bus 800 configured to, when a fault occurs, provide an extra standby channel so as to supply power to the load.

The bypass input bus 800 is electrically connected to the system output end 500. The second power supply 200 configured in the system is configured to, when the first power supply 100 is faulty, supply power to the system. When the second power supply 200 is used to supply power, another device in the system is not faulty; for example, the first power processing unit 701, the second power processing unit 702, and the direct current bus 400 all operate properly. If these parts are damaged, the system cannot operate properly. To ensure, during corrective maintenance, that the system output end 500 is normal, the bypass input bus 800 needs to be used, where the bypass input bus 800 serves as a standby power supply. A bypass input bus and the first power supply 100 have a same output voltage, which may meet normal use of the load. The bypass input bus 800 is directly connected to the system output end 500. It should be noted that, the bypass input bus 800 does not pass through another device of the system so as to avoid a case in which the standby power supply cannot be started when another part in the system is damaged, which should be understood by a person of ordinary skill in the art. Details are not described again.

In a preferable solution, the switch unit 300 provided in the present disclosure includes a relay, a contactor, or a silicon controlled rectifier, or uses a mechanical switch or a semiconductor switch so as to implement a quick switch. A shorter gap period of a switch action is better because a longer gap period of a switch action indicates a higher voltage that is of the direct current bus capacitor and the second power supply 200 and needs to output to the direct current bus 400, and a higher requirement for a capacitance value of the direct current bus 400, such that power of a unidirectional discharging subunit 602 is also improved, which is disadvantageous to reduction of volumes and costs of the direct current bus 400 and the unidirectional discharging subunit 602.

In a preferable solution, the first power supply 100 is an industrial frequency alternating current, and an output voltage of the first power supply 100 may be selected according to a requirement; for example, the output voltage is 200 volts (V) of domestic load, or 380 V. An industrial frequency alternating current of 50 hertz (Hz) or 60 Hz may be selected as an industrial frequency alternating current, which is not specifically limited, and should be understood by a person of ordinary skill in the art. Details are not described again.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

A person of ordinary skill in the art may understand that all or some of the steps of the methods in the embodiments may be implemented by a program instructing relevant hardware. The program may be stored in a computer readable storage medium. The storage medium may include a read-only memory (ROM), a random access memory (RAM), a magnetic disk, or an optical disc.

The uninterruptible power system provided by the present disclosure has been described in detail, and ordinary persons skilled in the art can make variations to implementation manners and the application scope without departing from the spirit of the embodiments of the present disclosure. In conclusion, the content of this specification should not be understood as a limitation on the present disclosure.

What is claimed is:

1. An uninterruptible power system, wherein the system comprises:
   a direct current bus;
   a first power supply configured to supply power to the system;
   a second power supply configured to supply power to the system when the first power supply is faulty;
   a switch unit configured to:
      switch the first power supply to the second power supply when the first power supply is faulty such that the second power supply supplies power to the system; and
      switch the second power supply to the first power supply when a fault in the first power supply is restored such that the first power supply supplies power to the system;
   a first power processor configured to:
      perform alternating current (AC)/direct current (DC) rectification on a voltage to obtain a bus voltage of a direct current bus when the first power supply supplies power to the system; and
      perform DC/DC conversion on a current to obtain the bus voltage of the direct current bus when the second power supply supplies power to the system,
      wherein the direct current bus is configured to transport electric energy and supply power to the system in an action gap period formed when the switch unit performs a switch between the first power supply and the second power supply;
   a second power processor configured to perform DC/AC inversion on the bus voltage of the direct current bus so as to obtain an output voltage;
   a bidirectional power converter configured to:
      supply power to the second power supply when the first power supply supplies power to the system; and
      supply power to the system in the action gap period formed when the switch unit performs the switch between the first power supply and the second power supply; and
   a system output end configured to connect to a load and output, to the load, power supplied by the system,
   wherein the first power supply is electrically connected to a first access end of the switch unit,
   wherein the second power supply is electrically connected to a second access end of the switch unit,
   wherein an output end of the switch unit is electrically connected to a first wiring end of the first power processor,
   wherein a second wiring end of the first power processor is electrically connected to one end of the bidirectional power converter,
   wherein the other end of the bidirectional power converter is electrically connected to the second power supply,
   wherein the second wiring end of the first power processor is electrically connected to one end of the direct current bus,
   wherein the other end of the direct current bus is electrically connected to a first wiring end of the second power processor, and
   wherein a second wiring end of the second power processor is electrically connected to the system output end.

2. The uninterruptible power system according to claim 1, wherein the first power supply is a mains input bus, and wherein the second power supply is an energy storage battery.

3. The uninterruptible power system according to claim 2, wherein the bidirectional power converter comprises a unidirectional charging subunit and a unidirectional discharging subunit, wherein the unidirectional charging subunit is configured to charge the energy storage battery, wherein the unidirectional discharging subunit is configured to discharge from the energy storage battery to the system, so as to implement that both the energy storage battery and the direct current bus supply power to the system in a gap period of a switch performed by the switch unit, and wherein the unidirectional charging subunit and the unidirectional discharging subunit are connected in parallel between the direct current bus and the energy storage battery.

4. The uninterruptible power system according to claim 3, further comprising a bypass input bus configured to provide an extra standby channel so as to supply power to the load when a fault occurs, wherein the bypass input bus is electrically connected to the system output end.

5. The uninterruptible power system according to claim 4, wherein the mains input bus and the bypass input bus are industrial frequency alternating currents.

6. The uninterruptible power system according to claim 2, further comprising a bypass input bus configured to provide an extra standby channel so as to supply power to the load when a fault occurs, wherein the bypass input bus is electrically connected to the system output end.

7. The uninterruptible power system according to claim 4, wherein the mains input bus and the bypass input bus are industrial frequency alternating currents.

8. The uninterruptible power system according to claim 6, wherein the energy storage battery comprises a NiMH battery.

9. The uninterruptible power system according to claim 2, wherein the energy storage battery comprises a Ni—Cd battery.

10. The uninterruptible power system according to claim 2, wherein the energy storage battery comprises a lithium iron phosphate battery.

11. The uninterruptible power system according to claim 2, wherein the energy storage battery comprises and iron battery.

12. The uninterruptible power system according to claim 1, wherein the switch unit comprises a mechanical switch or a semiconductor switch.

13. The uninterruptible power system according to claim 12, wherein the mechanical switch comprises a relay or a contactor, and wherein the semiconductor switch comprises a silicon controlled rectifier. battery comprises an iron battery.

* * * * *

UNITED STATES PATENT AND TRADEMARK OFFICE
CERTIFICATE OF CORRECTION

| | | |
|---|---|---|
| PATENT NO. | : 10,014,719 B2 | Page 1 of 1 |
| APPLICATION NO. | : 15/083858 | |
| DATED | : July 3, 2018 | |
| INVENTOR(S) | : Chuntao Zhang | |

It is certified that error appears in the above-identified patent and that said Letters Patent is hereby corrected as shown below:

In the Claims

Column 14, Claim 13, Line 59-60 should read:
a silicon controlled rectifier.

Signed and Sealed this
Twenty-eighth Day of August, 2018

Andrei Iancu
*Director of the United States Patent and Trademark Office*